(12) United States Patent
Chemelewski

(10) Patent No.: US 7,049,980 B1
(45) Date of Patent: May 23, 2006

(54) AUTOMOBILE ENTRY DETECTOR FOR A GARAGE

(76) Inventor: David Chemelewski, 205 Ashford Ct., Noblesville, IN (US) 46060

( * ) Notice: Subject to any disclaimer, the term of this patent is extended or adjusted under 35 U.S.C. 154(b) by 0 days.

(21) Appl. No.: 10/646,044

(22) Filed: Aug. 22, 2003

(51) Int. Cl.
*B60Q 1/48* (2006.01)
(52) U.S. Cl. ............ 340/932.2; 340/942; 340/556
(58) Field of Classification Search ........... 340/932.2, 340/942, 556, 555
See application file for complete search history.

(56) References Cited

U.S. PATENT DOCUMENTS

| | | | | |
|---|---|---|---|---|
| 3,493,925 A * | 2/1970 | Brancale | ............. | 340/932.2 |
| 3,896,414 A * | 7/1975 | Rulo | ............. | 340/942 |
| 4,284,971 A * | 8/1981 | Lowry et al. | ............. | 340/904 |
| 4,808,997 A * | 2/1989 | Barkley et al. | ............. | 340/942 |
| 4,870,413 A * | 9/1989 | Walden et al. | ............. | 340/932.2 |
| 5,177,479 A * | 1/1993 | Cotton | ............. | 340/932.2 |
| 5,969,637 A * | 10/1999 | Doppelt et al. | ............. | 340/825.69 |
| 6,181,095 B1 * | 1/2001 | Telmet | ............. | 318/480 |

\* cited by examiner

*Primary Examiner*—Benjamin C. Lee

(57) ABSTRACT

The automobile entry detector for garages is a signaling system designed to assist a motorist with properly positioning a vehicle upon pulling into a parking structure, such as a household garage. This device could be offered in various embodiments, including as an aftermarket accessory for existing garage door openers or as an integral part of a new garage door opener design. The preferred embodiment of the device includes a garage door opener motor and controller, a garage door opener control switch, a light transmitter that transmits a beam of light to a light receptor with an LED indicator, a photocell, and an indicator lamp located on the rear wall of the garage. The LED indicator is extinguished when the beam of light is unbroken, and the photocell relays this information to activate the lamp at the same time as the LED. When the leading edge of a vehicle passes through the light beam, the LED and indicator lamp are illuminated and are only extinguished after the trailing edge of the vehicle has passed through the beam, indicating that the vehicle is properly positioned to allow unobstructed closure of the garage door.

7 Claims, 3 Drawing Sheets

AUTOMOBILE ENTRY DETECTOR FOR A GARAGE

BACKGROUND OF THE INVENTION

1. Field of the Invention

The present invention relates to a position indicator for assisting a motorist with properly positioning a vehicle upon pulling into a parking structure such as a household garage. The automobile entry detector for a garage has particular utility in connection with electric garage door openers, utilizing the existing electronic equipment of the opener and signaling the driver when the entire length of the car has passed into the interior of the garage.

2. Description of the Prior Art

Since the invention of the automobile, properly positioning the vehicle in a parking structure has been a consideration. Since garages are often used for storage as well as parking, various items typically surround the parking area and could be damaged by the vehicle if it is not positioned correctly. In addition, many garages house two or more vehicles, requiring the motorist to adeptly maneuver and position the vehicle to avoid the side walls of the structure, stored items, and the second vehicle. When multiple vehicles are parked near each other in a garage, the vehicles must be positioned such that the doors of each vehicle will not strike and dent the other vehicles when opened. Many drivers also have difficulty determining how far to pull into a parking structure. Oftentimes this requires exiting the car to determine if the vehicle is sufficiently within the interior of the parking structure to successfully close the door without contacting the vehicle. In the case of automatic garage doors, significant damage could be done to a vehicle if it is not pulled far enough into the parking structure before the door is closed. Therefore, a device which could signal the driver when the vehicle was sufficiently pulled into a parking structure so the door could be closed behind the vehicle would be highly desirable, eliminating the hassle and frustration of walking around the vehicle to check for clearance before properly positioning the vehicle. In addition, if this device could be implemented using the existing garage door opener circuitry, it would reduce cost and effort of installation, as well as centralizing the control functions in one area.

The use of garage parking position indicators is known in the prior art. For example, U.S. Pat. No. 5,177,479 to John B. Cotton discloses a garage parking position indicator that utilizes a pair of sensors that transmit a signal which cross-intercepts the leading edge of a vehicle as it enters the garage and alerts the driver when the trailing edge has passed the sensors. However, the Cotton '479 patent makes no indication that existing garage door opener circuitry can be utilized, rendering it more expensive for the consumer. Additionally, since the existing garage door circuitry is not employed by the Cotton '479 device, the consumer must make multiple installations of circuitry in the parking structure.

U.S. Pat. No. 4,808,997 to George J. Barkley and Roberta Barkley discloses a photoelectric vehicle position indicating device for use in parking and otherwise positioning vehicles. The positioning device includes a photoelectric control unit mounted on an overhead structure and directing a downward beam that is intercepted by the vehicle in question, energizing an alarm signal for a predetermined amount of time. However, the Blakely, et al. '997 device would not be suitable for use in multicar garages since it would only monitor a single position in the garage. Neither is the Blakely, et al. '997 device able to be implemented with existing garage door openers. Furthermore, the audible alarm of the Blakely, et al. '997 device would be disturbing to pets, babies, or any passengers who might have fallen asleep in the vehicle. Lastly, the Blakely, et al. '997 device fails to indicate if the rear of the car is within the interior of the parking structure, instead alerting the user only when the front of a vehicle is in a desired location. For vehicles of varying lengths, this could lead to substantial damage if the garage door were accidentally shut on the rear end of the vehicle.

Similarly, U.S. Pat. No. 3,493,925 to Louis Brancale discloses the use of a magnetic proximity switch mounted to the front wall of the garage to light a signal lamp as the vehicle approaches closely to such front wall or to a pylon upon which the magnetic proximity detector is mounted. However, since close proximity is required by the Brancale '925 device, either the front wall or such pylon would be an obstruction to walking or working in the front of the vehicle. Furthermore, the close proximity requirement of the Brancale '925 device would preclude the placement of work benches or shelves along the front wall of the garage. Finally, the Brancale '925 device makes no provision for implementation with existing garage door opener circuitry.

U.S. Pat. No. 4,665,378 to John E. Heckethorn discloses a motor vehicle garaging safety method and apparatus wherein a signal light is projected downward when a garage door is fully opened to provide a light spot on the dashboard of a vehicle when it is parked in the proper position within a garage. However, the Heckethorn '378 device would be difficult to use if backing a vehicle into the garage since the light would be present on the rear end or in the back seat of the vehicle. In addition, vehicles of varying lengths would cause the Heckethorn '378 device to transmit the light beam to varying parts of the car to indicate proper positioning. Lastly, since nc indication is given by the Heckethorn '378 device that a vehicle has been pulled forward sufficiently to allow unobstructed door closure, significant amounts of damage could occur if a vehicle longer than that with which the driver is accustomed is positioned incorrectly in the garage.

Likewise, U.S. Pat. No. 6,218,962 B1 to Dale E. Fiene discloses a parking guide for automatic garage door openers that consists of an add on feature that directs a beam of light onto the front of the hood of the vehicle as it proceeds into the garage. The motorist pulls forward into the garage until the light coincides with a predetermined reference point on the vehicle. However, the Fiene '962 B1 device would require the modification of the hood of the vehicle with a decal in order for the device to be useful to a driver unaccustomed to driving a particular vehicle. Moreover, the Fiene '962 B1 device would be difficult to use if backing a vehicle into the garage since the light would be present on the rear end or in the back seat of the vehicle. Additionally, the Fiene '962 B1 technology could not easily be used for multiple vehicles unless each was modified with a decal on the hood. Finally, since no indication is given by the Fiene '962 B1 device that a vehicle has been pulled forward sufficiently to allow unobstructed door closure, significant amounts of damage could occur if a vehicle longer than that with which the driver is accustomed is positioned incorrectly in the garage.

Lastly, U.S. Pat. No. 5,945,907 to Michael Yaron, Bernard Katz, and Karl E. Geisel discloses an apparatus and methods for parking a vehicle using a position detection sensor. A sensing and indicating device is mounted at a fixed location to determine the distance between the sensor and an approaching vehicle. The sensor provides visual and/or audible indication of the distance between the vehicle and the sensor, allowing the vehicle to be positioned within a defined space or envelope. However, the Yaron, et al. '907 patent only alerts the driver as to the placement of one side of the vehicle and would require the motorist to predetermine the location of the rear of the vehicle in relation to the door for each different vehicle driven into the garage. Furthermore, a nonprimary driver of a vehicle would have no indication from the Fiene '962 B1 device of whether the vehicle had been pulled far enough into the garage to allow unobstructed closure of the door. Finally, the Fiene '962 B1 device cannot be incorporated into an existing automatic garage door opener.

While the above-described devices fulfill their respective, particular objectives and requirements, the aforementioned patents do not describe an automobile entry detector for garages that signals the driver when the entire length of the car has passed into interior of the garage and utilizes the existing garage door opener circuitry. None of the aforementioned devices give any indication that the circuitry of an existing garage door opener could be utilized in the invention; therefore, the consumer would need to make a separate installation for the Cotton '479, Blakely, et al. '997, Brancale '925, Heckethorn '378, Fiene '962 B1, and Yaron, et al. '907 devices. In addition, these devices are likely to cost more than a unit that implements the circuitry of an existing garage door opener and would require a separate control center from the garage door opener. The Blakely, et al. '997 and Fiene '962 B1 devices would require multiple installations for use in multicar garages since each device can only monitor a single position in the garage. Furthermore, the audible alarm of the Blakely, et al. '997 device would be disturbing to pets, babies, or any passengers who might have fallen asleep in the vehicle. Additionally, the Blakely, et al. '997, Heckethorn '378, Fiene '962 B1, and Yaron, et al. '907 devices fail to indicate if the rear of the car is within the interior of the parking structure, which could lead to substantial damage if the garage door were accidentally shut on the rear end of the vehicle. Since close proximity is required by the Brancale '925 device, either the front wall or such pylon would be an obstruction to walking or working in the front of the vehicle and would preclude the placement of work benches or shelves along the front wall of the garage. In addition, the Heckethorn '378 and Fiene '962 B1 devices would be difficult to use if backing a vehicle into the garage since the position indicator light would be present on the rear end or in the back seat of the vehicle instead of on the hood or dashboard. Moreover, vehicles of varying lengths would cause the Heckethorn '378 device to transmit the light beam to varying parts of the car to indicate proper positioning, and the Fiene '962 B1 device would require the modification of the hood of the vehicle with a decal.

Therefore, a need exists for a new and improved automobile entry detector for garages that can be used for signaling the driver when the entire length of a vehicle has passed into the parking structure. In this regard, the present invention substantially fulfills this need. In this respect, the automobile entry detector for garages according to the present invention substantially departs from the conventional concepts and designs of the prior art, and in doing so provides an apparatus primarily developed for the purpose of utilizing the existing garage door opener circuitry to determine when the entire length of a vehicle has passed into the interior of the garage and signaling the driver as to such.

SUMMARY OF THE INVENTION

In view of the foregoing disadvantages inherent in the known types of garage parking position indicators now present in the prior art, the present invention provides an improved automobile entry detector for garages, and overcomes the above-mentioned disadvantages and drawbacks of the prior art. As such, the general purpose of the present invention, which will be described subsequently in greater detail, is to provide a new and improved automobile entry detector for garages and method which has all the advantages of the prior art mentioned heretofore and many novel features that result in a automobile entry detector for garages which is not anticipated, rendered obvious, suggested, or even implied by the prior art, either alone or in any combination thereof.

To attain this, the present invention essentially comprises a garage door opener motor and controller, a garage door opener control switch, a light transmitter that transmits a beam of light to a light receptor with an LED indicator, a photocell, and an indicator lamp.

A second embodiment of the invention uses the existing safety circuitry of an existing garage door opener to switch a lamp on when an obstruction to garage door closure is detected.

There has thus been outlined, rather broadly, the more important features of the invention in order that the detailed description thereof that follows may be better understood and in order that the present contribution to the art may be better appreciated.

There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved automobile entry detector for garages that has all of the advantages of the prior art garage parking position indicators and none of the disadvantages.

It is another object of the present invention to provide a new and improved automobile entry detector for garages that may be easily and efficiently manufactured and marketed.

An even further object of the present invention is to provide a new and improved automobile entry detector for garages that has a low cost of manufacture with regard to both materials and labor, and which accordingly is then susceptible of low prices of sale to the consuming public, thereby making such a automobile entry detector for garages economically available to the buying public.

Still another object of the present invention is to provide a new automobile entry detector for garages that provides in the apparatuses and methods of the prior art some of the advantages thereof, while simultaneously overcoming some of the disadvantages normally associated therewith.

Even still another object of the present invention is to provide an automobile entry detector for garages for alerting a motorist when a vehicle is properly positioned within a parking structure. This aids the driver in properly positioning his vehicle to minimize damage to stored items in the garage.

Yet another object of the present invention is to provide an automobile entry detector for garages that reduces the amount of time required to properly position a vehicle within a garage facility. This allows the motorist to position a vehicle within a garage without the need to exit the vehicle and check the clearance on the front and rear end before parking the vehicle.

Lastly, it is an object of the present invention to provide a new and improved automobile entry detector for garages that eliminates the possibility that the trailing end of a vehicle will be damaged when the garage door is closed. This saves the vehicle's owner time and money by eliminating the need to repair a vehicle that has been damaged due to insufficient clearance between the vehicle and the garage door.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
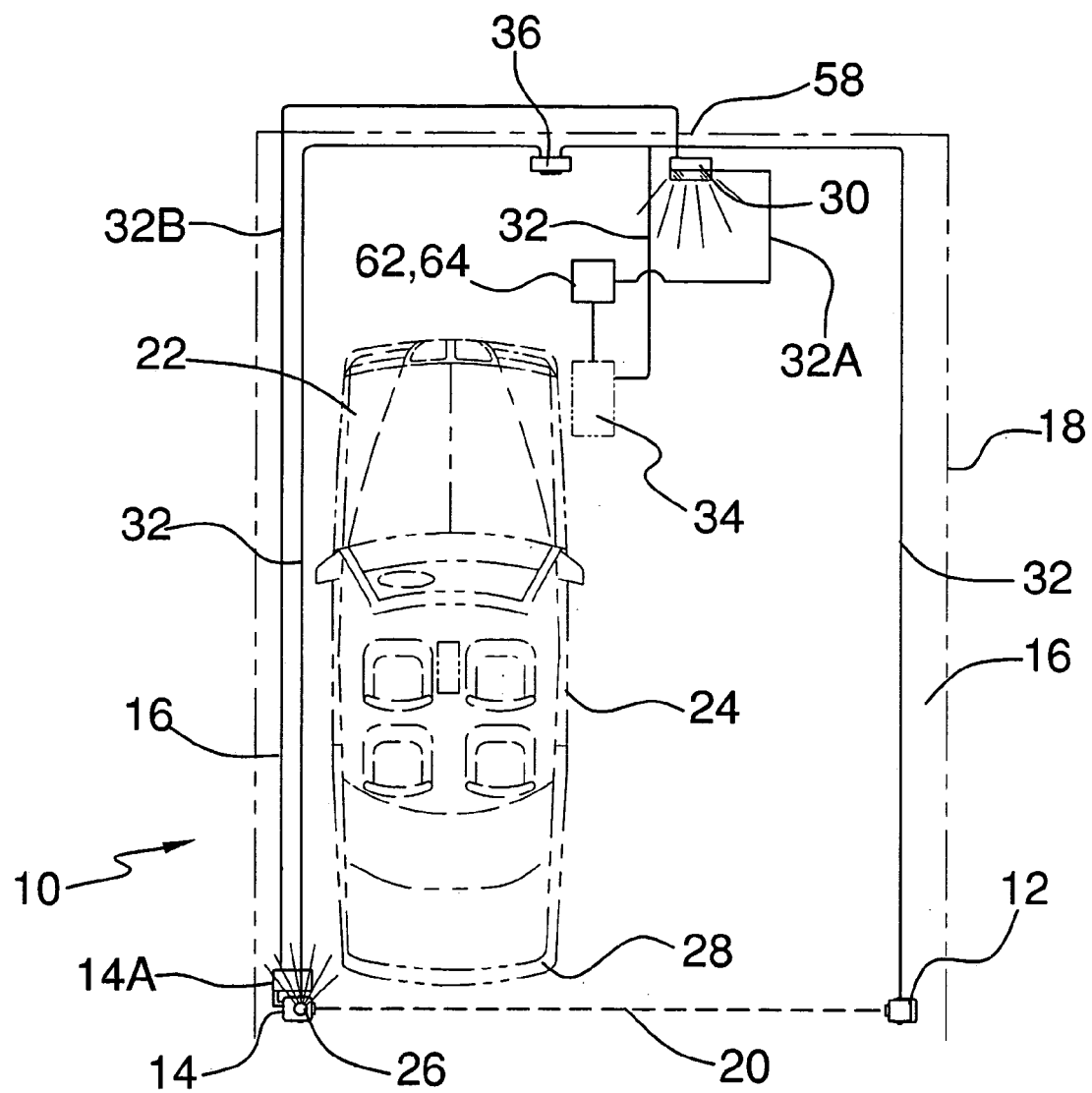
FIG. 1 is a top view of the preferred embodiment of the automobile entry detector for garages constructed in accordance with the principles of the present invention.

Referring now to the drawings, and particularly to FIGS. 1–4, a preferred embodiment of the automobile entry detector for garages of the present invention is shown and generally designated by the reference numeral 10.

In FIG. 1, a new and improved automobile entry detector for garages 10 of the present invention for signaling the driver when the entire length of a vehicle has passed into the parking structure is illustrated and will be described. More particularly, the automobile entry detector for garages 10 has a light transmitter 12 and a light receptor 14 located at the forward end of each side 16 of a parking structure 18, such as a typical garage. The light transmitter 12 transmits a beam of light 20 to the light receptor 14 which is broken when the leading edge 22 of the vehicle 24 enters the parking structure 18. The light receptor 14 includes an LED 26 that is illuminated when the light beam 20 is broken. Once the trailing edge 28 of the vehicle 24 passes the transmitter 12 and receptor 14, the light beam 20 is once again unbroken, and the LED 26 is extinguished. In addition a position indicator lamp 30 in positioned on the rear wall 58 of the parking structure 18 to signal the driver that the vehicle 24 is properly positioned. An existing garage door opener controller 34 can be used to control the circuit. The light transmitter 12 is connected to the indicator lamp 30 by a wire 32 passing along or through the side 16 of the structure 18. The light receptor 14 is connected to the garage door control switch 36 in a similar manner. The control switch 36 and the indicator lamp 30 are wired to the garage door opener controller 34. To control the indicator lamp 30, a photocell could be connected to the light receptor 14 and to the indicator lamp 30 to automatically activate the lamp 30 when the light beam 20 is broken, extinguishing the lamp 30 after the vehicle 24 is properly positioned in the parking structure 18. Alternatively, a light pipe could be used to transmit light from the light receptor LED 26 to the rear wall 58 of the parking structure 18. A third alternative would be to add a switch 62 to the safety circuit 64 responsible for preventing the garage door from closing if an interruption of the light beam 20 is detected. This switch 62 could subsequently be used to trip the indicator lamp 30 on the rear wall 58 of the parking structure 18.

Figure 2:
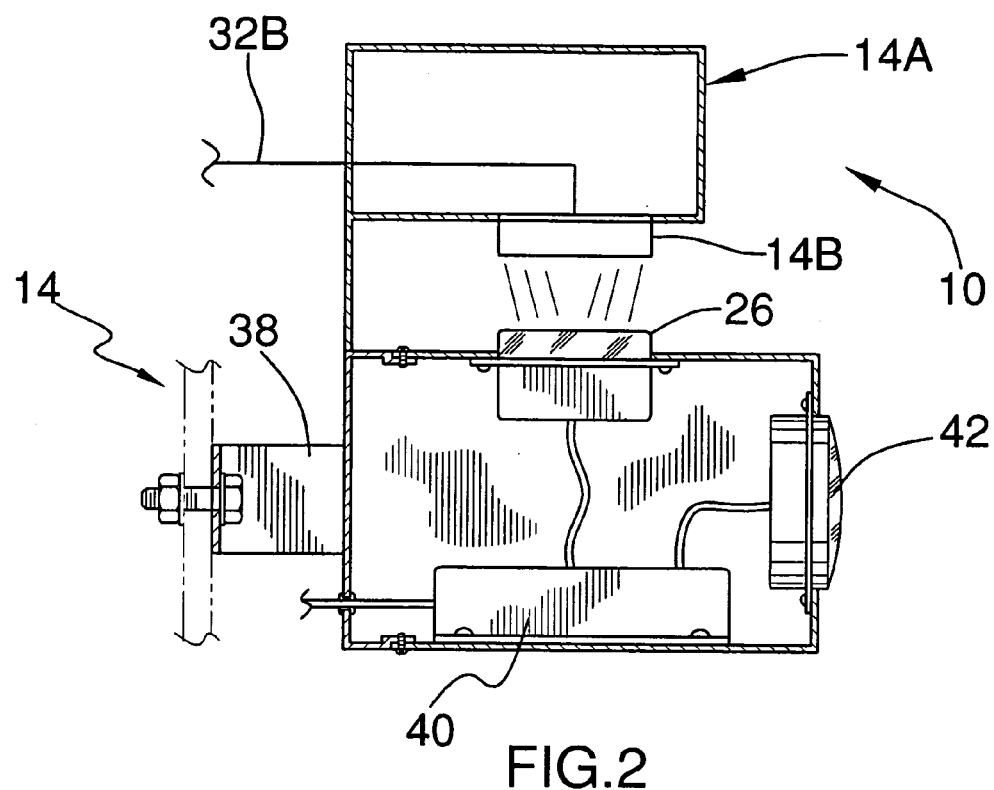
FIG. 2 is a left side cross sectional view of the light receptor of the automobile entry detector for garages of the present invention.

FIG. 2 shows a cross-sectional view of the light receptor 14 of the automobile entry detector for garages 10. The receptor 14 is secured to the wall with a mounting bracket 38 and has an electronic control unit 40 wired to the LED 26 and the receptor lens 42. The electronic control unit 40 would contain the photocell which would be used to determine when to illuminate the indicator lamp 30, or, in the third embodiment, it would contain the added switch which would be used to trip the indicator lamp 30 on the rear wall 58 of the parking structure 18. The light pipe of the second embodiment would be affixed to the light receptor 14 near the LED 26.

Figure 3:
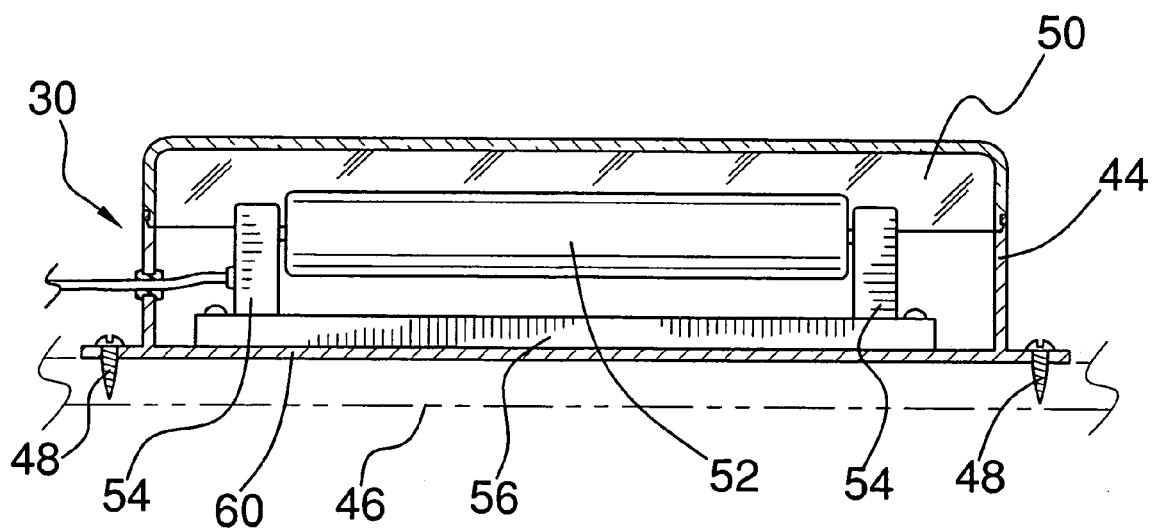
FIG. 3 is a longitudinal cross sectional view of the indicator lamp of the automobile entry detector for garages of the present invention.

FIG. 3 shows a cross-sectional view of the indicator lamp 30 of the automobile entry detector for garages 10. The indicator lamp 30 has a protective housing 44 used to mount the lamp 30 onto the mounting surface 46. Conventional wood screws 48 could be used to attain this objective. The front surface of the housing 44 is a light cover 50 placed over the light bulb 52, which is inserted into the light bulb receptacles 54. The light bulb receptacles 54 are connected to a light bulb support 56 that is affixed to the rear wall 60 of the housing 44. The lamp may be molded into the cord 32.

Figure 4:
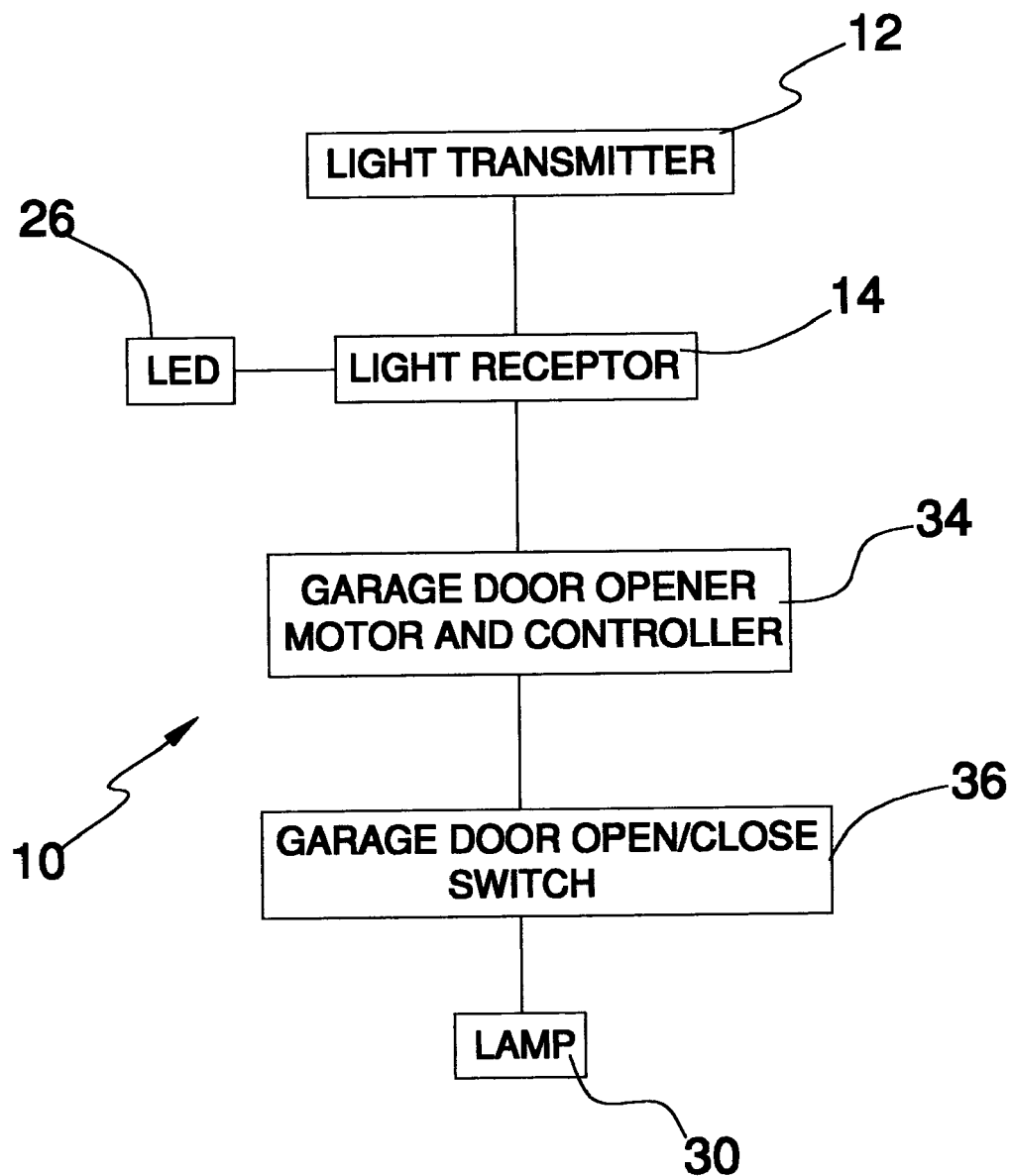
FIG. 4 is a functional block diagram of the automobile entry detector for garages of the present invention.

FIG. 4 shows a simple functional diagram of the automobile entry detector for garages 10. The light transmitter 12 feeds a beam of light 20 to the light receptor 14. The light receptor 14 illuminates the LED 26 only if the beam of light is interrupted. The garage door opener controller 34 utilizes the information from the light receptor 14 to determine if the garage door can be raised and lowered. User input as to the desire to open or close the garage door is received by the garage door control switch 36. The indicator lamp 30 would also be wired to the control circuitry and would only be illuminated if the beam of light 20 is broken.

In use, it can now be understood that, upon approaching the door of the parking structure 18, the driver of a vehicle 24 would use the garage door control switch 36 (probably via a remote control located in the vehicle 24) to open the door of the parking structure 18. The driver would then slowly advance the vehicle 24 into the parking structure 18. As the leading edge 22 of the vehicle 24 enters the parking structure 18, the light beam 20 is interrupted, and the LED 26 is extinguished and indicator lamp 30 is illuminated. Once the trailing edge 28 of the vehicle 24 passes the transmitter 12 and receptor 14, the light beam 20 is once again unbroken, and the LED 26 is illuminated and indicator lamp 30 is extinguished. This alerts the driver that the vehicle 24 is properly positioned to allow unobstructed closure of the door of the parking structure 18.

While a preferred embodiment of the automobile entry detector for garages has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as metal, plastic, or a variety of wood may be used for the housing of the indicator lamp. Also, protective cover could be made from a translucent or transparent material such as plastic or glass. And although signaling the driver when the entire length of a vehicle has passed into the parking structure has been described, it should be appreciated that the automobile entry detector for garages herein described is also suitable for use in carwashes and service stations.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An automobile entry detector for garages comprising:
    a light transmitter unit capable of transmitting a beam of light;
    a garage door opener controller unit electrically connected to said light transmitter unit;
    a garage door opener motor connected to said controller unit;
    a garage door opener activation switch connected to said controller unit;
    a light receptor unit electrically connected to said controller unit;
    an LED connected to said light receptor unit;
    a safety circuit connected to said controller unit;
    a switch connected to said safety circuit and to said light receptor unit; and
    an indicator lamp electrically connected to said switch.

2. The automobile entry detector for garages of claim 1 wherein said light transmitter and said light receptor are positioned within a parking structure toward the forward entry wherein said beam of light from said light transmitter unit is received by said light receptor unit and wherein the passage of the leading edge of a vehicle into said parking structure will interrupt said beam of light and said beam of light will continue to be interrupted until the trailing edge of said vehicle passes said light transmitter unit and said light receptor unit.

3. The automobile entry detector for garages of claim 2 wherein said LED is illuminated only when said beam of light is interrupted.

4. The automobile entry detector for garages of claim 1 wherein said indicator lamp is connected to the rear wall of the parking structure into which said detector is mounted wherein said lamp is located at eye level with respect to the driver of a vehicle.

5. The automobile entry detector for garages of claim 1 wherein said indicator lamp further comprises:
    a housing having a rear wall and side walls;
    a light bulb receptacle connected to said rear wall of said housing;
    a light bulb removably connected to said light bulb receptacle; and
    a protective cover surrounding said light bulb without contacting said light bulb and removably connected to said side walls of said housing.

6. The automobile entry detector for garages of claim 5 wherein said protective cover is made from a translucent or transparent material.

7. The automobile entry detector for garages of claim 1 wherein said switch controls the illumination of said indicator lamp and illuminates said lamp when an interruption of said light beam from said light transmitter unit to said light receptor unit is detected.

* * * * *